(12) United States Patent
Buckholtz et al.

(10) Patent No.: US 6,685,904 B1
(45) Date of Patent: Feb. 3, 2004

(54) PROCESS FOR MAKING PHOSPHORUS HALIDES AND OXYHALIDES

(75) Inventors: Harry E. Buckholtz, Lewiston, NY (US); Mohamed W. Hisham, Grand Island, NY (US)

(73) Assignee: Occicdental Chemical Corporation, Dallas, TX (US)

( * ) Notice: Subject to any disclaimer, the term of this patent is extended or adjusted under 35 U.S.C. 154(b) by 0 days.

(21) Appl. No.: 09/061,754

(22) Filed: Apr. 16, 1998

(51) Int. Cl.$^7$ ............................................... C01B 25/10
(52) U.S. Cl. ........................................ 423/300; 423/304
(58) Field of Search ................................ 423/299, 300, 423/304

(56) References Cited

U.S. PATENT DOCUMENTS

| | | | | |
|---|---|---|---|---|
| 3,052,520 A | * | 9/1962 | Draeger et al. ............. | 423/300 |
| 3,119,666 A | * | 1/1964 | Nametz ....................... | 423/300 |
| 3,136,606 A | * | 6/1964 | Belohlav et al. ........... | 423/300 |
| 3,652,437 A | * | 3/1972 | Mezey et al. ............... | 423/299 |
| 4,143,121 A | * | 3/1979 | Stenzel et al. .............. | 423/299 |
| 4,335,085 A | * | 6/1982 | Rieck et al. ................ | 423/300 |

OTHER PUBLICATIONS

Algred Stock: "Das Verhalten der Nichtmetall–Hydride Gegenüber Chlor", Bernichte der Deutschen Chemischen Gesellschaft, vol. 53, pp 837–842, 1920 (no month).*
Mellor, "A Comprehensive Treatise on Inorganic and Theoretical Chemistry", vol. VIII, pp. 998–1012, Mar. 1947.*
Gmalins Handbuch der Anorganischen Chemie, Phosphor, p. 415 (1965) (no month).
U.J.J. Le Verrier, Annales de Chemie et de Physique, vol. 60, pp. 174–194 (1835) (no month).
LeVerrier, Annalen der Chemie und Pharmcie, vol. 16, pp. 333–338 (1836) (no month).

* cited by examiner

*Primary Examiner*—Ngoc-Yen Nguyen
(74) *Attorney, Agent, or Firm*—Ricahrd D. Fuerle

(57) ABSTRACT

Disclosed is a process for producing phosphorous trichloride, phosphorous pentachloride, or phosphorous tribromide by reacting phosphine gas with chlorine gas or bromine gas, in a mixture with hydrogen gas. The phosphine is dried and the reaction is performed at a temperature up to about 250° C. The phosphorous trichloride or phosphorous tribromide product can be reacted with oxygen to form phosphorous oxychloride or phosphorous oxybromide, respectively.

20 Claims, No Drawings

PROCESS FOR MAKING PHOSPHORUS HALIDES AND OXYHALIDES

BACKGROUND OF THE INVENTION

This invention relates to a process for making phosphorous halides and oxyhalides from phosphorus-containing byproducts. In particular, it relates to a process wherein, in the presence of hydrogen, phosphine is reacted with chlorine gas to prepare phosphorous trichloride, phosphorous pentachloride, or phosphorous tribromide.

Sodium hypophosphite is prepared by reacting tetraphosphorus, $P_4$, with an aqueous solution of sodium hydroxide. This reaction produces a solution of about 50 wt % sodium hypophosphite, about 25 wt % sodium phosphite, and about 25 wt % of a gaseous mixture of phosphine and hydrogen in a 1:1 molar ratio. (Other alkali metal or alkaline earth metal hypophosphites can be made in the same manner.) At the present time, the practice is to burn the phosphine-hydrogen mixture in air followed by scrubbing in water to produce phosphoric acid. However, the resulting phosphoric acid has about the same value as the $P_4$ starting material, so no value is added by these additional steps.

SUMMARY OF THE INVENTION

We have discovered that the phosphine-containing byproducts in the sodium hypophosphite reactor can be reacted with chlorine to produce phosphorous trichloride and hydrogen chloride without a significant loss of chlorine due to reaction of the chlorine with hydrogen. We have found that this reaction can be made to produce almost entirely phosphorous trichloride as the phosphorous-containing product under certain reaction conditions, despite the presence of hydrogen. Since the reaction is exothermic, it can be run adiabatically and continuously. Cooling is not needed unless the adiabatic temperature rise results in temperatures over 250° C.

We have also found that air or oxygen can be introduced into the reactor downstream of the phosphine-chlorine reaction zone to stoichiometrically produce $POCl_3$ as the virtually pure product. At the temperatures used in this invention, the oxygen will not react with the hydrogen that is present.

DESCRIPTION OF THE PREFERRED EMBODIMENTS

The starting material for the process of this invention is phosphine, $PH_3$. Phosphine is a gas which typically contains small amounts of its dimer, diphosphine, $P_2H_4$. The invention is limited to mixtures of phosphine with hydrogen because the most commercially important process from which the phosphine is obtained necessarily includes hydrogen as a co-product. In that process, the hydrogen-phosphine mixture is obtained from a sodium hypophosphite reactor, in approximately a 1 to 1 molar ratio, but the invention is also applicable to mixtures of phosphine and hydrogen at molar ratios between 0.05 to a 0.95. Because water reacts with phosphorous trichloride to form phosphorous acid, the phosphine should be moisture free (i.e., less than 5 ppm of water and preferably less than 1 ppm water). The phosphine can be dried by passing it through a partial condenser and a suitable drying agent or moisture removal procedure, such as a molecular sieve, as is well known in the art.

The dry phosphine is reacted with chlorine gas according to the equation:

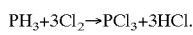

$PH_3 + 3Cl_2 \rightarrow PCl_3 + 3HCl.$

Bromine gas can also be used to produce phosphorous tribromide and that reaction is also part of this invention. However, chlorine gas is preferred as phosphorous trichloride is more important commercially. Since the chlorine reacts with the phosphine in a 1:3 phosphine:chlorine ratio, less than a stoichiometric amount of chlorine will leave unreacted phosphine and more than a stoichiometric amount of chlorine will produce byproducts such as $PCl_5$. Therefore, the molar ratio of chlorine to phosphine should be between 3 and about 3.1 and is preferably as close to stoichiometric as possible. If the desired product is phosphorous pentachloride the molar ratio of chlorine to phosphine should be between 5 and about 5.1.

The reaction can be performed at any temperature (e.g., room temperature) up to about 250° C. At higher temperatures hydrogen that is mixed with the phosphine reacts with chlorine to form HCl and at lower temperatures the reaction is slow. Thus, it is preferable to perform the reaction at about 50 to about 125° C. We have found that if excess chlorine is not present, i.e., the amount of chlorine is not in excess of the amount that will react stoichiometrically with the phosphine (3 moles of chlorine, $Cl_2$, per mole of phosphine) a temperature range of about 50 to about 70° C. will result in nearly 100% conversion of the phosphine to phosphorous trichloride and the HCl produced will not be much in excess of 3 moles per mole of phosphine. If excess chlorine is present, higher temperatures (125 to 250° C.) are needed to obtain high yields phosphorous trichloride without the production of phosphorous pentachloride in the final product. The reaction can be started at room temperature and, since it is an exothermic reaction, the temperature can be permitted to increase adiabatically as long as the temperature does not exceed 250° C. The reaction proceeds to completion at atmospheric pressure.

The products of the reaction, a phosphorous halide and hydrogen chloride, are separated by first condensing the phosphorous halides (phosphorous trichloride, b.p.=75.5° C., phosphorous pentachloride, b.p.=162° C., and phosphorous tribromide, b.p.=172.9° C.) and then passing the non-condensible hydrogen chloride and unreacted hydrogen through a water scrubber to form hydrochloric acid, which can be sold or used in other chemical reactions. The hydrogen can be vented, burned, sold, or used in other reactions. Phosphorous trichloride and phosphorous tribromide are used to make phosphite esters, herbicides, and other chemicals. Phosphorous pentachloride is used to make pharmaceuticals and other specialty uses such as a chlorinating agent.

In an optional additional step, the phosphorous trichloride or phosphorous tribromide products can be reacted with oxygen to form phosphorous oxychloride, $POCl_3$ or phosphorous oxybromide, $POBr_3$ respectively. This reaction can be performed in situ without further isolation or purification of the phosphorous trichloride or phosphorous tribromide, but, to avoid making phosphoric acid, it must be performed after the phosphorous trichloride or tribromide have been formed. While oxygen gas can be used for this reaction, it is preferable to use air as it is less expensive and works as well. Phosphorous oxychloride and phosphorous oxybromide are easily separated liquids which are used as intermediates in making herbicides, plasticizers, and other products of commercial significance.

The following examples further illustrate this invention.

EXAMPLE 1

Hydrogen and phosphine in a 1:1 molar ratio were passed through a feed line of a 1 inch (2.54 cm) diameter quartz reaction tube. Chlorine in a 3.8 molar ratio to the phosphine was passed through the other feed line. At room temperature the gases mixed in the 26 inch (66 cm) long reaction zone. The temperature gradually rose to 65° C. as the chlorine reacted with the phosphine to form phosphorous trichloride and hydrogen chloride. An analysis of the reaction product showed that 70 wt % of the phosphorus-containing product was phosphorous trichloride and 30 wt % was phosphorous pentachloride.

EXAMPLE 2

The reaction was repeated except that the reaction zone was heated to 250° C. The phosphorus-containing product was 100 wt % phosphorous trichloride. (Phosphorous pentachloride, which forms when the phosphine:chlorine ratio exceeds 3, is unstable at temperatures above 125° C., and dissociates to $PCl_3$.)

EXAMPLE 3

A mixture of phosphine, hydrogen, and nitrogen (as a diluent) gases was fed through a glass tube into a chamber where the phosphine was reacted with chlorine gas. The reaction mixture was heated to various temperatures. The phosphorous trichloride product was reacted with air at room temperature to produce phosphorous oxychloride. Complete (about 100%) conversion of the $PCl_3$ to $POCl_3$ was achieved as demonstrated by proton nuclear magnetic resonance.

The following table gives the feed composition, the maximum reaction temperature, and the products.

| $PH_3:H_2:Cl_2$ Feed Composition (mole ratio) | Temperature (° C.) | Products |
|---|---|---|
| 1:1:3 | 50–70 | Only $PCl_3$ |
| | 100–125 | $PCl_3$ with small amount of chlorophosphine (2–3 wt%) |
| | 190–225 | $Cl_2$ started to react with $H_2$ to form HCl |
| 1:1:4 | 50–70 | 40 wt% $PCl_3$ and 60 wt% $PCl_5$ |
| | 100–125 | 55 wt% $PCl_3$ and 45 wt% $PCl_5$ |
| 1:1:3.5 | 50–70 | 80 wt% $PCl_3$ and 20 wt% $PCl_5$ |

The above experiments show that $PCl_5$ and HCl begin to form at temperatures outside the range of about 50 to about 70° C. and when chlorine in much in excess of stoichiometric.

We claim:

1. A process for preparing $PX_n$ comprising
   (A) adding $X_2$ gas to a mixture of dry phosphine and hydrogen in a molar ratio of phosphine to hydrogen between 0.05 and 0.95, where X is chlorine or bromine, n is 3 or 5 when X is chlorine, n is 3 when X is bromine, and the molar ratio of said $X_2$ gas to said phosphine is between 3 and about 3.1 when n is 3 and between 5 and about 5.1 when n is 5; and
   (B) maintaining the temperature of said mixture at less than about 250° C., whereby said $X_2$ gas reacts with said phosphine to produce said $PX_n$ and there is no significant loss of X due to the reaction of said $X_2$ gas with said hydrogen.

2. A process according to claim 1 wherein X is chlorine.

3. A process according to claim 1 wherein X is bromine.

4. A process for preparing $POX_3$ comprising performing the process of claim 1 where n is 3, followed by the additional last step of reacting said $PX_3$ product with oxygen to produce $POX_3$, where said reaction of said $PX_3$ product with oxygen is performed in situ without further isolation or purification of said $PX_3$ product.

5. A process according to claim 1 performed at atmospheric pressure without cooling.

6. A process according to claim 1 run adiabatically.

7. A process according to claim 1 run continuously.

8. A process according to claim 1 wherein said mixture contains less than 5 ppm of water.

9. A process according to claim 8 wherein said mixture is dried by passing it through a partial condenser and removing moisture.

10. A process according to claim 1 including additional last steps of condensing said $PX_n$ and passing the remaining gas through a water scrubber.

11. A process for making $POX_3$ comprising
   (A) producing $PX_3$ by reacting a mixture of dry phosphine gas and hydrogen in a molar ratio of phosphine to hydrogen between 0.05 and 0.95, and less than 1 ppm water with $X_2$ gas in a molar ratio of said $X_2$ gas to said phosphine of 3 to about 3.1 at a temperature of about 50 to about 125° C.;
   (B) reacting said $PX_3$ with oxygen in situ without further isolation or purification of said $PX_3$, where X is chlorine, bromine, or a mixture thereof.

12. A process according to claim 11 wherein said reaction of $X_2$ with phosphine is performed at about 50 to about 70° C.

13. A process according to claim 11 performed adiabatically and continuously.

14. A process according to claim 11 wherein X is chlorine.

15. A process for making phosphorous trichloride comprising
   (A) hydrolyzing tetraphosphorus with sodium hydroxide to produce a solution and a gaseous mixture of phosphine and hydrogen;
   (B) drying said gaseous mixture of phosphine and hydrogen to less than 1 ppm water; and
   (C) reacting said phosphine in said mixture with chlorine gas in an amount stoichiometric up to about 0.1 mole % in excess of stoichiometric at a temperature between about 50 and about 125° C., where there is no significant loss of said chlorine due to the reaction of said chlorine gas with said hydrogen.

16. A process according to claim 15 wherein the molar ratio of hydrogen to phosphine in said mixture is about 1.

17. A process according to claim 15 wherein the temperature of said reaction is about 50 to about 70° C.

18. A process according to claim 15 run adiabatically.

19. A process according to claim 15 run continuously.

20. A process for preparing $POCl_3$ comprising performing the process of claim 15 followed by the additional last step of reacting said phosphorous trichloride product with oxygen to produce phosphorous oxychloride, where said reaction with oxygen is performed in situ without further isolation or purification of said $PCl_3$.

* * * * *